United States Patent

[11] 3,595,149

| [72] | Inventor | Sakae Fujimoto<br>Tokyo, Japan |
|---|---|---|
| [21] | Appl. No. | 742,719 |
| [22] | Filed | July 5, 1968 |
| [45] | Patented | July 27, 1971 |
| [73] | Assignee | Kabushiki Kaisha Ricoh<br>Tokyo, Japan |
| [32] | Priority | July 10, 1967 |
| [33] | | Japan |
| [31] | | 59584 |

[54] SHUTTER COCKING AND FILM METERING DEVICE FOR A CAMERA
4 Claims, 4 Drawing Figs.

[52] U.S. Cl............................................. 95/31
[51] Int. Cl............................................. G03b 1/40,
G03b 1/62
[50] Field of Search............................................. 95/31, 31
AC, 31 FS; 242/71, 71.4, 71.5

[56] References Cited
UNITED STATES PATENTS

| 3,009,406 | 11/1961 | Takahama.................. | 95/31 |
| 3,157,100 | 11/1964 | Maitani....................... | 95/31 |
| 3,253,526 | 5/1966 | Steisslinger................. | 95/31 |
| 3,447,440 | 6/1969 | Ettischer..................... | 95/31 X |
| 3,448,670 | 6/1969 | Suzuki......................... | 95/31 |

*Primary Examiner*—Samuel S. Matthews
*Assistant Examiner*—Russell E. Adams, Jr.
*Attorney*—Burgess, Ryan & Hicks ABSTRACT: A member for driving the shutter cocking device is fixed on a shaft interlocked to the film winding knob, and the member for driving a film winding spool is connected frictionally to said knob. When the film is wound up by a predetermined amount, and the spool driving member comes to a stop, said member releases its grip on the shaft, and the shaft is further rotated to drive the shutter cocking device.

PATENTED JUL 27 1971 3,595,149

INVENTOR
SAKAE FUJIMOTO

BY Burgess, Ryan & Hicks
ATTORNEY

SHUTTER COCKING AND FILM METERING DEVICE FOR A CAMERA

BACKGROUND OF THE INVENTION

In cameras of the so-called self-cocking type wherein the shutter is cocked every time the film charged in the camera is wound up by one frame, the desired self-cocking can be easily attained when a film having perforation is used. In such a camera the sprocket wheel for advancing the film by engaging its perforations may be interlocked with the shutter cocking mechanism so that the motion of the film drives the sprocket and the shutter cocking mechanism.

However, when a nonperforated film, such as a rolled film with a base paper, is used, the nonperforated film is advanced by a friction-wheel whose peripheral surface is pressed against the surface of the base paper of the film on the takeup spool. When the nonperforated film has been wound up by one frame, and when the above-mentioned advance has been detected through some means or other, the winding of the film is stopped.

In such a camera it is quite impossible to give a friction-wheel such a large pressure force against the film as to transmit sufficient power to lock the shutter by driving the shutter charging device with the rotation of the friction-wheel.

On the other hand, the rotation angle of the knob (or lever) for winding a nonperforated film by operation from outside the camera is gradually reduced as picture taking proceeds because the diameter of the film layer on the takeup spool is increased, so that a smaller angular rotation will advance the same length of film.

However, it is necessary to give a predetermined amount of movement such as a predetermined angle of rotation to the shutter charging device to charge the shutter, and therefore, if the rotation of said knob for winding the film is desired to be interlocked to the shutter charging device, it is necessary to provide some means or other for allowing a constant rotation angle for said knob. In other words, in order to wind the film, varying angles of rotation are required as picture taking progresses and film accumulates on the takeup spool, but a constant angle of rotation of the shutter cocking mechanism is required.

SUMMARY OF THE INVENTION

In accordance with the present invention, the member for driving the shutter charging device and the members for driving the film winding spool are separately provided on a winding shaft which is rotated by the rotation of the film winding knob.

As a member for driving the shutter charging device, a gear fixed on said winding shaft, for example, is used.

As the spool driving member, a hollow shaft which is mounted loosely and coaxially on said shaft is employed. A ratchet gear coaxially mounted on the winding shaft and a coil spring which is connected to both the hollow shaft and the ratchet gear at opposite ends thereof and is wound up around the winding shaft with a high binding force, are used.

When the film winding knob is rotated, in the case where rotation of the ratchet gear is not restricted, the spool driving members are rotated with the winding shaft with which they are connected by the frictional force caused by the binding force of the coil spring and they drive the spool. When the rotation of the ratchet gear is restricted by some means or other after a predetermined amount of the film has been taken up, the spool driving members come to a stop. As the film winding knob continues to rotate, the spring releases its grip from the winding shaft, thus allowing the winding shaft to continue to rotate to cock the shutter.

In accordance with the present invention, the cocking of the shutter is carried out with power supplied directly by the hand of the operator as he turns winding shaft 7, and therefore the cocking of the shutter can be correctly carried out without depending on power derived from the moving film.

The object of the present invention is to provide a device for carrying out the self-cocking of a camera correctly by using a simple mechanism.

The excellent characteristics of the present invention will be further clarified in the following explanations given in accordance with the attached drawing.

DESCRIPTION OF THE PREFERRED EMBODIMENTS

Figure 1:
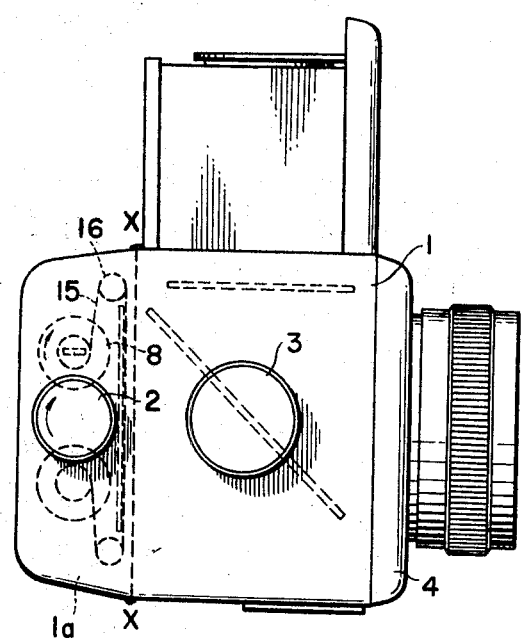
FIG. 1 shows a side-view of single lens reflex camera provided with the apparatus of the present invention.

FIG. 1 is an outline-side view showing a single lens reflex camera for nonperforated film, provided with the device of the present invention.

Numeral 1 shows the outer box of the camera body; 1a is the film holding portion which can be separated from said outer box of the camera body along line X-X; 2 is a knob for winding the film; 3 is an operation-knob for moving the lens mounting member 4 back and forth relative to the camera body.

Figure 2:
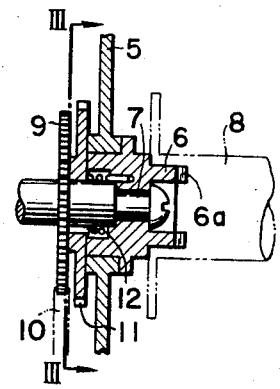
FIG. 2 shows a sectional view of driving shafts for a film winding spool in the camera in FIG. 1.

In FIG. 2, a vertical inner wall, shown by 5, is parallel to the outer wall of the camera body and is spaced inwardly therefrom.

The stepped winding shaft 7 is coaxially inserted into the hollow shaft 6 with a flange loosely abutted against the wall of the camera body in such a manner that said stepped winding shaft 7 cannot be externally drawn out.

The nonperforated film winding spool 8, the end portion thereof which is loosely inserted over the inner end of the hollow shaft 6, is integrally rotated with the hollow shaft 6 as the conventional concave groove provided within the end portion of the spool is connected to the fin 6a which is integrally formed on the surface of the internal end of the hollow shaft 6.

The gear 9 is coaxially mounted loosely on the external end portion of winding shaft 7. The winding shaft 7 is connected to the film winding knob 2 as shown in FIG. 1 directly or through the gear 9.

Said gear 9 is interlocked to the shutter cocking device through the gear 10 which is meshed with gear 9.

The ratchet gear 11 is loosely mounted on the winding shaft 7 between the external end surfaces of the gear 9 and the hollow winding shaft 6, and the coil spring 12 is inserted within an annular space between the hollow shaft 6 and the winding shaft 7 which passes loosely through the center of the hollow shaft 6.

The coil spring 12 encircles winding shaft 7 and normally grips the surface of the winding shaft with a strong frictional grip. One end of coil spring 12 (to the left in FIG. 2) is connected to ratchet gear 11. The other end is attached to the hollow shaft 6. Hollow shaft 6 and ratchet gear 11 are loosely mounted on winding shaft 7 and are rotatable relative thereto. Normally the frictional grip of coil spring 12 binds together the coil spring, the ratchet gear 11, hollow shaft 6, and the winding shaft 7, and these four elements rotate together. The coil direction of the coil spring 12 is such that the coils proceed around the winding shaft 7 from the ratchet gear 11 to the hollow shaft in a direction opposite to the direction of rotation of the winding shaft. With this construction, if ratchet gear 11 is immobilized and rotation of the winding shaft 7 occurs, the continued slight rotation of the hollow shaft 6 will cause the coils of the coil spring 12 to expand in diameter and lose their frictional grip on the winding shaft 7. This loss of grip will prevent further rotation of the hollow shaft 6.

When the knob 2 of FIG. 1 is rotated in the direction as shown by an arrow in FIG. 1 the film winding spool 8 is rotated in the direction as shown by an arrow in FIG. 1 by means of the hollow shaft 6 which is connected to the winding shaft 7 through the coil spring 12, to take up the film 15 around the spool.

The film passes around the roller 16, the peripheral surface of which has a large friction-coefficient in combination with the film backing and rotates said roller as it is wound.

Figure 3:
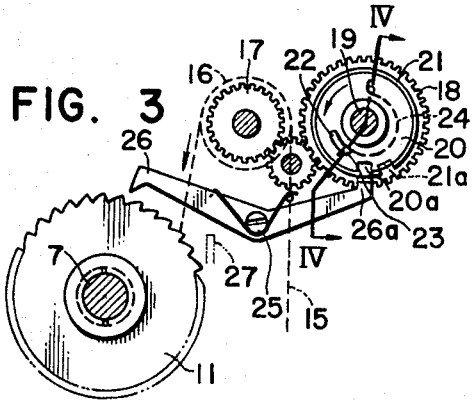
FIG. 3 shows a sectional view along III-III in FIG. 2 of the driving shafts, film guide roller and means for determining the amount of film winding up.

The gear 17 which is united coaxially to roller 16, rotates the gear 18 through an appropriate transmission gear in the direction as shown by an arrow in FIG. 3.

Figure 4:
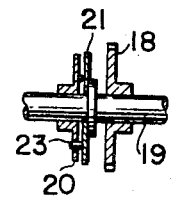
FIG. 4 shows a sectional diagram along IV-IV in FIG. 3.

Two disks 20 and 21 are mounted on the shaft 19 on which the gear 18 is fixed as shown in FIG. 4.

However, disk 20 is fixed on the shaft 19 and the diameter of the periphery thereof is slightly smaller than the diameter of the other disk 21 which is freely rotatable on the shaft 19.

The short arcuate groove 22 is concentric with and cut through the disk 20, and a pin 23 fixed on the other disk 21 protrudes loosely through the groove. The free end of the expanding loop-form spring 24, one end of which is fixed on the disk 20, is engaged by the pin 23. The tendency of the ends of spring 24 to move apart urges rotation in the counterclockwise direction to the disk 21 which is united to the pin 23 in such a manner that the disk 21 can rotate clockwise relative to the disk 20 within the permissive range established by the groove hole 22 and the pin 23.

The notches 20a and 21a are provided on the respective peripheries of the disks 20 and 21, and said notches 20a and 21a are prepared in such a manner that when the pin 23 is on the position as shown in FIG. 3 within the groove hole 22, the notch 21a is normally ahead of, the notch 20a by an angle equal to the allowable movement of the pin 23 within the groove 22.

In addition, the pawl 26 which is rotatably supported by the shaft 25 extends between the disk 21 and the left ratchet 11 as shown in FIG. 3, and by the elastic force of the spring 24, it is given a counterclockwise bias as shown in FIG. 3.

When the notches 20a and 21a are aligned and reach a position where said notches can engage the bent projection 26a of one arm end of the pawl 26, the projection 26a engages said notches and at the same time the tooth of the other arm end of the pawl engages the teeth of the ratchet gear 11.

When shutter mechanism is cocked one arm end 26a of the rod is within the notches of the disks. When the shutter release button is depressed the rod 26 is turned to the right as one arm is pushed up by an appropriate element 27 interlocked to the shutter operating element such as the shutter button. The arm end 26a of the pawl escapes from the notches 20a and 21a, and at the same time, the two notches 20a and 21a are moved out of alignment under the influence of spring 24 so that when the shutter button is released arm end 26a of the rod cannot fall into the notches.

The rear portion (on the left side of the diagram) of the sidewall of the camera body as shown in FIG. 1, is extended backwards from the camera body, and the mechanism shown in FIG. 3 is contained therein.

The film holding portion is provided between both sides of the camera in such a manner that the film holding portion can be freely disconnected from the camera or can be freely opened by means of a hinge from the camera body.

The following is an explanation about the functions of the present invention.

As shown in FIG. 1, the film 15 is inserted within the camera, and when the knob 2 is turned in the direction as shown by an arrow, the spool 8 is rotated through the winding shaft 7, the spring 12 and the hollow shaft 6 as shown in FIG. 2, and at the same time, the guide roller 16 (see FIG. 3) is also rotated. Spring 12 served during winding to act as a clutch between winding shaft 7 and hollow shaft 6.

Therefore, the gear 17, which is concentrically united to the roller 16, rotates both the shaft 19 (see FIG. 4) and the disk 20 (which is united to said shaft 19) in the direction as shown by an arrow in FIG. 3.

On the peripheral surface of the disk 21, which is rotatable relative to the shaft 19, the end of the bent projection 26a of the pawl 26 is press-contacted to frictionally retard the rotation of the disk 21. Therefore, as shaft 19 rotates the disk 20 alone is initially rotated in advance by the permissive length of the groove 22, and accumulates power in the loop spring 24 by compressing its ends together.

When the rear end of the groove hole 22 (the upper end in FIG. 3) contacts the pin 23 on the disk 21, the notches 20a and 21a of the two disks come into alignment, and thereafter the two disks rotate together in the direction as shown by an arrow in FIG. 3 as the pin 23 is pushed by the rear end of the groove hole 22. The diameter of the guide roller 16 is adjusted in such a manner that when the shaft 19 of the disk 20 is rotated almost one turn, the film 15 is advanced by one frame.

The disks 20 and 21 are rotated as described above with the notches 20a and 21a aligned and when the projected end 26a of the rod 26 falls into said notches the tooth of the other end of the pawl engages the teeth of the ratchet gear 11.

Thereafter, even if the knob 2 of FIg. 1 should be continuously rotated in the direction as shown by an arrow in FIG. 1, the rotation of the ratchet gear 11 is prevented. Further rotation of the winding shaft 7 loosens the spring 12, and the rotation is not transmitted to the hollow shaft 6, but the gear 9 alone on the shaft 7 is continuously rotated. All the winding force is then transmitted to the shutter cocking device through the gear 10 which is geared into the gear 9.

Thus, it is possible to cock the shutter with a sufficiently strong force as is quite different from the case in which the guide roller 16 which is rotated by a friction against the film is used as the drive shaft for the shutter cocking device.

After the shutter has been cocked, the shutter cocking device comes to a stop, and therefore the rotation of the knob 2 and the rotation of the winding shaft 7 is also stopped.

In other words, the amount of the rotation of the knob 2 or the shaft 7 comes to be a predetermined amount.

The gear 9 can be interlocked to a device for counting the exposed frames.

When the shutter button is operated in order to expose the wound film, the element 27 as shown in FIG. 3 rotates the pawl 26 clockwise, and therefore the bent projection 26a of the rod escapes from the two notches.

As a result the disk 21 is rotated counterclockwise relative to the disk 20 by the elastic force of the spring 24, and the two notches 20a and 21a move out of alignment. Thereafter, even if the hand should be removed from the shutter button the bent projection of the pawl takes only such a position as to be press-contacted against the periphery of the disk 21 of larger diameter. Consequently, the tooth of the other arm end of the pawl is disconnected from the ratchet gear 11, and it is ready for the following film winding operation.

In accordance with the present invention, the structure of the device becomes simple because of the clever clutch mechanism in which the radial shrinkage and expansion of the binding spring 12 is utilized. Additionally, the drive shaft for winding up the film from the outside of the camera can be rotated for a number of consecutive shutter cocking operations without winding the film even after the film is wound up by one frame, and therefore the present invention is especially effective as the self-cocking device for a miniature cameras.

I claim:

1. A film winding and shutter cocking device comprising:
   a winding shaft rotatable in a winding direction;
   means connecting the winding shaft to the shutter for cocking the shutter upon rotation of the winding shaft through a shutter cocking angle;
   a rotatable member mounted coaxially of the winding shaft and rotatable independently of the winding shaft;
   a second shaft mounted coaxially of the winding shaft and rotatable independently thereof;
   means for connecting a film takeup spool to the second shaft for rotation therewith;

a helical spring coiled about and normally gripping the winding shaft firmly for rotation therewith, said spring having a first end engaging the rotatable member for rotation therewith and a second end engaging the second shaft, the coils of said spring proceeding from the rotatable member to the second shaft coiling about the winding shaft in a direction opposite to the winding direction, whereby rotation of the second shaft in the winding direction relative to the rotatable member causes said helical spring to expand and loosen its grip on the winding shaft; and measuring means for stopping rotation of the rotatable member after said rotatable member has rotated through a winding angle less than the shutter cocking angle.

2. The device of claim 1 wherein:

the rotatable member comprises a ratchet wheel;

the measuring means comprises a pawl engageable with the ratchet wheel, a film-contacting roller contacting the film for rotation thereby as the film is wound on the takeup spool, and control means for holding said pawl out of engagement with the ratchet wheel until the roller has been rotated through a desired rotation angle and then moving said pawl into locking engagement with the ratchet wheel.

3. The device of claim 2 wherein the control means comprises:

pivot means for supporting the pawl for rotation between a disengaged position in which the pawl does not engage the ratchet wheel and an engaged position in which the pawl does engage the ratchet wheel;

resilient pawl-moving means for urging the pawl into the engaged position;

a control shaft rotatable in response to rotation of the film-contacting roller;

a circular first disk fixed to the control shaft;

a circular second disk mounted coaxially of the control shaft and rotatable relative thereto;

means for limiting the rotation of the first disk relative to the second disk to rotation between a normal and a driving position;

means for resiliently biasing the first disk into the normal position;

a first notch extending inward from the periphery of the first disk;

a second notch extending inward from the periphery of the second disk, said second notch being aligned with the first notch when the first disk is in the driving position and out of alignment with the first notch when the first disk is in the normal position;

an arm connected to the pawl for rotation therewith, said arm having a contact member normally resiliently urged into contact with the periphery of the second disk by the pawl-moving means when the pawl is in the disengaged position, said contact member being movable into an engaged position within the notches of the first and second disks when said notches are aligned, said movement advancing the pawl into the engaged position; and means operable following an exposure of the film for moving the pawl out of engagement with the ratchet wheel into the disengaged position.

4. A shutter cocking and film advancing mechanism for a camera having a shutter comprising:

a winding shaft passing through the outer casing of the camera, said winding shaft being rotatable through a predetermined shutter-cocking angle for cocking the shutter;

a ratchet wheel mounted on the winding shaft and rotatable relative thereto;

a hollow shaft mounted on the winding shaft and rotatable relative thereto;

means on the hollow shaft for engaging a film spool;

a helical spring within the hollow shaft coiled about and normally firmly gripping the winding shaft, said spring having a first end engaging the ratchet gear and a second end engaging the hollow shaft, said spring coiling about the winding shaft in a direction opposite to the direction of rotation of the winding shaft during a winding operation as said spring proceeds from the ratchet wheel to the hollow shaft, whereby rotation of the hollow shaft in the winding direction relative to the ratchet wheel causes the spring to unwrap slightly and loosen its grip on the winding shaft;

a pawl pivotally mounted on a support and rotatable between a disengaged position and an engaged position in which the pawl engages the ratchet wheel and prevents rotation thereof in the winding direction;

a pawl spring urging the pawl into the engaged position;

means operable following an exposure to move the pawl to the disengaged position;

an arm attached to and rotatable with the pawl;

a friction roller placed to contact the film with its periphery and to be turned by frictional engagement with the film as said film is advanced;

a control shaft connected to the friction roller and rotatable therewith;

a circular first disk coaxially mounted on the control shaft for rotation therewith;

a circular second disk, greater in diameter than the first disk, mounted coaxially with the first disk and rotatable relative thereto;

an offcenter pin attached to one disk and extending in an axial direction from said disk through an arcuate opening in the other disk, whereby rotation of the disks relative to each other is limited to movement between a normal and a driving position, rotation of the first disk relative to the second disk in the direction of rotation of the control shaft during film winding moving the disks from the normal to the driving position;

resilient means biasing the disks into the normal position;

a contact member on the arm normally resiliently engaging the circular periphery of the second disk under the urging of the pawl spring, such normal engagement preventing rotation of the pawl from the disengaged to the engaged position;

an inwardly extending first notch in the periphery of the first disk;

an inwardly extending second notch in the periphery of the second disk;

the first and second notches being aligned when the first and second disks are in the driving position and not aligned when said disks are in the normal position;

the resilient engagement of the engagement of the contact member with the periphery of the second disk creating sufficient frictional drag to hold said disk motionless while the first disk rotates from the normal to the driving position; and rotation of the driving shaft through an angle less than the shutter-cocking angle sufficing to wind sufficient film to cause the friction roller to rotate the first disk through a full turn.